May 14, 1940.  J. W. MacCLATCHIE  2,200,337
DRILL BIT
Filed Dec. 18, 1937
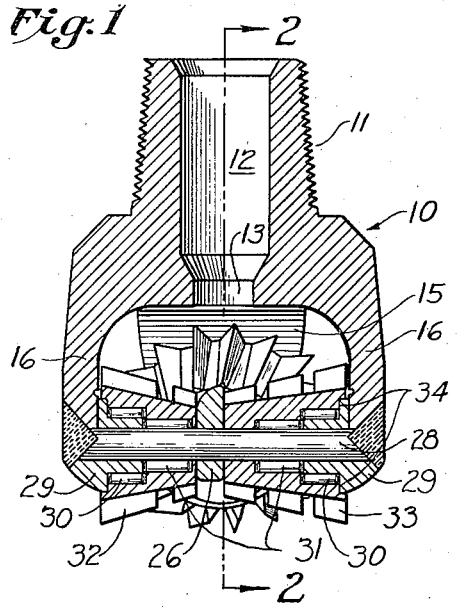
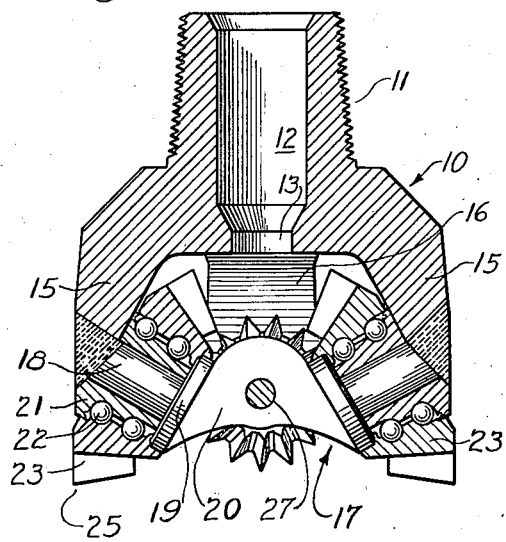
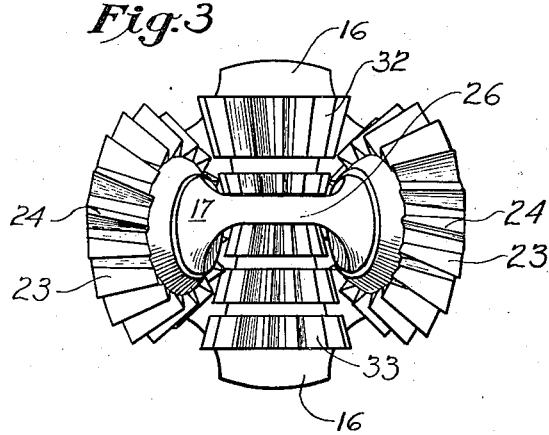
INVENTOR.
John W. MacClatchie
BY Robert M. McManigal
ATTORNEY.

UNITED STATES PATENT OFFICE 2,200,337

DRILL BIT

John W. MacClatchie, Los Angeles, Calif., assignor to MacClatchie Manufacturing Company of California, Compton, Calif., a corporation of California Application December 18, 1937, Serial No. 180,576

4 Claims. (Cl. 255—71)

This invention relates to well drilling tools, and particularly to rotary drill bits.

An object of my invention is to provide a drill bit in which the bearing members are taper fitted on the bearing supports in order to provide a very close contact between said members in order to provide a bit which is capable of withstanding the stresses imposed upon the bit during operation.

Another object of my invention is to provide a drill bit with double row radial thrust ball bearings and roller bearings to eliminate excessive friction thus providing a drill bit that is easy to operate and long life.

Another object of my invention is to shape and combine the cutters so that the drill bit will bore a straight and accurate hole.

Another object of my invention is to provide a drill bit in which the inner bearing members are securely mounted on their respective shafts.

My invention has many other objects, advantages, and features, some of which, with the foregoing, will be set forth at length in the following description where I shall outline one form of the invention, which I have selected for illustration in the drawing accompanying and forming a part of the present specification. In the said drawing, I have shown one form of my invention, but it is to be understood that I do not limit myself to such form, since the invention, as expressed in the claims, may be embodied in a large number of forms.

Referring to the drawing:

Figure 1 is a sectional view through the drill bit of my invention.

Figure 2 is a sectional view through the bit taken along the line 2—2 of Figure 1.

Figure 3 is a bottom view of the drill bit shown in Figures 1 and 2.

The body 10 of the drill bit is provided at its upper end with a tool joint 11 so that it may be attached to a drill collar in the conventional manner. Extending through the center of the bit is a vertical cylindrical passageway 12 and an orifice 13 in order to provide for the passage of the conventional drilling fluid. The lower end of said body is provided with 2 pairs of legs 15 and 16 to support the cutter mechanism. The inner sides of the legs 15 are inclined as shown in Figure 2 to accommodate the position of the large cutters.

Arched between the legs 15 is a bearing truss 17, consisting of bearing supports 18, flanges 19 and a saddle 20. The inner bearing members 21 are taper fitted on the bearing supports 18 in order to provide a very close fit between said members and thereby provide a bit which will withstand the stresses imposed during the operation of the bit. The outer surfaces of the bearing members 21 are recessed in order to provide for double rows of radial thrust ball bearings 22 on which the outside cutters 23 are adapted to be mounted. The inner portion of the cutters 23 serves as the outer ball race for the ball bearings 22. The large cutters 23 are adapted to rotate on the double row radial thrust bearings 22 which are adapted to transfer thrust as well as bearing loads. The inner bearing members 21 are adapted to the ball bearings 22 so that they transmit the thrust load as well as the bearing load to the bearing truss 17 and thus to the body 10.

The large cutters 23 are conical in shape and are inclined in position as shown in Figure 2. The teeth of the cutters are diagonal on the cone surface as indicated at 24 in Figure 3. The outer edges 25 of said cutters are inclined downward so that the outer circumference of the cutters contact the formation first and thereby accurately shape the hole.

The flanges 19 face the front of the large cutters 23 and are provided to house the bearing mechanism. The saddle 20 between the flanges is offset as shown at 26 in Figures 1 and 3 so that the inner cutters can be mounted in such a position that they break down the material in the center of the hole.

The center of the saddle 20 is provided with an opening 27 in which a cross shaft 28 is mounted. Mounted on the cross shaft 28 by means of inner bearing members 29, rollers 30 and 31 are inner cutters 32 and 33. The inner bearing members 29 are taper fitted on the cross shaft 28 in order to provide a very close contact between said members and thereby provide a bit which is capable of withstanding the stresses imposed during operation.

The rollers 30 are adapted to rotate between the bearing members 29 and the outer portions of the cutters 32 and 33 which serve as the outer roller races for the roller bearings 30. The rollers 31 are adapted to rotate between the cross shaft 28 and the inner portions of the cutter 32 and the middle portion of cutter 33 as shown in Figure 1. The inner portion of cutter 33 is adapted to rotate directly on the cross shaft 28.

The inner cutters 32 and 33 are conical in shape with the teeth running lengthwise the cone. Annular recesses are cut through the teeth of said cutters to increase the cutting pressure on the remainder of the teeth. The thrust load is low on the inner cutters so that it can be absorbed by the surfaces 34 of the inner bearing members 29. The inner cutter 33 is longer than the cutter 32 so that it can reach the offset portion of the saddle 20 of the bearing truss 17 at the center of the bit, which allows said cutter to break down the center of the cone. The cutters are frustums of cones and thus when in rotation the inner portions of the teeth have a sliding motion which tends to break or fracture the formation.

To assemble the bit, the cross shaft 28 is inserted in the opening 27 of the saddle 20. The inner bearing members 29, rollers 30 and 31, and cutters 32 and 33 are then mounted on the cross shaft 28. The bearing members 21, the double rows of ball bearings 22 and the cutters 23 are mounted on the bearing supports 18. The ends of the cross shaft 28 and the inner bearing members 29 are then secured to the legs 16, for example, by welding. The ends of the bearing truss 17 and the inner bearing members 21 are secured to the legs 15.

From the foregoing description taken in connection with the accompanying drawing, the uses, advantages, and operation of the roller bit will be readily understood by those skilled in the art.

While I have described the form of my invention which I now consider to be the best embodiment thereof, I desire to have it understood that the articles shown are merely illustrative and that the invention is not to be limited to the details disclosed herein, but is to be accorded the full scope of the appended claims.

I claim:

1. In a bearing structure, a body provided with a pair of legs, inter-connected bearing supports secured to each of said legs, and ball races taper fitted on said bearing supports, said bearing supports and the inner ball races being welded to said legs.

2. In a structure of the type described, a body provided with a pair of legs, interconnected bearing supports secured to each of said legs, ball races taper fitted on said bearing supports, and cutters formed integral with the outer ball races by providing teeth in the periphery of the outer ball races, the extreme outer edges of said cutters being adapted to first engage the formation, thereby effecting a straight and accurate hole, said bearing supports and the inner ball races being welded to said legs.

3. In a bearing structure, a body provided with a leg, a cutter having an opening, a bearing support secured to the leg and extending into the opening, and an inner ball race taper fitted on said bearing support, said bearing support and inner ball race being welded to said leg.

4. In a structure of the type described, a body having a pair of legs spaced transversely of the body to accommodate cutters therebetween and having a central opening to deliver fluid between and in open communication with the upper portions of the cutters, cutter supports carried by said legs, and cutters rotatably mounted on said supports, the extreme outer edges of said cutters having the largest periphery and being arranged to first engage the formation and effect a straight and accurate hole of greater diameter than that of said body.

JOHN W. MacCLATCHIE.